United States Patent [19]

Dieffenbacher

[11] 4,323,514
[45] Apr. 6, 1982

[54] COFFEE OIL

[75] Inventor: Albrecht Dieffenbacher, Saint-Légier, Switzerland

[73] Assignee: Societe d'Assistance Technique pour Produits Nestle S.A., Lausanne, Switzerland

[21] Appl. No.: 166,146

[22] Filed: Jul. 7, 1980

[51] Int. Cl.³ .............................................. C09F 5/02
[52] U.S. Cl. .................................. 260/412.3; 260/424; 260/412.4
[58] Field of Search ................... 260/412.3, 412.4, 424

[56] References Cited

U.S. PATENT DOCUMENTS 2,230,582   2/1938   Beller ................................. 260/424

OTHER PUBLICATIONS

Chem. Absts. vol. 68: 113500k (1968).
Coffee Processing Technology vol. 2 pp. 174–182 (1963).

Primary Examiner—John F. Niebling
Attorney, Agent, or Firm—Vogt & O'Donnell

[57] ABSTRACT

A process for improving coffee oil characterised in that the coffee oil is contacted, under conditions of agitation, with a solution of a strong mineral acid in a monohydric aliphatic alcohol containing from 1 to 3 carbon atoms and separating the oil layer from the alcohol layer.

7 Claims, No Drawings

COFFEE OIL

The present invention relates to a process for improving coffee oil, more particularly for the deterpenisation thereof.

Green coffee beans contain approximately 10-15% coffee oil and when used for the preparation of a soluble coffee the beans are roasted, ground, and then extracted with hot water. The soluble solids pass into the extraction liquid which is then steam distilled and dried to yield a soluble coffee powder. Most of the coffee oil stays with the spent grounds from which it can be collected and used in the form of an emulsion with coffee aroma to aromatize soluble coffee by spraying on to the soluble coffee powder so preserving or restoring the pleasant characteristic odour of roast coffee.

However coffee oil contains certain ingredients such as terpenes an example of which is cafestol, free fatty acids and unsaponifiables which render it unsuitable for use as an edible vegetable oil. We have found that by a very mild treatment of coffee oil, a sufficient quantity of these ingredients can be extracted so that the treated oil falls within the standards laid down for edible vegetable oils. (Codex alimentarius standards: General Standard for edible oils and fats CAC/RS 19-1969). The treated coffee oil, in the meantime, retains its suitability for aromatizing soluble coffee powder.

According to the present invention there is provided a process for improving coffee oil characterised in that the coffee oil is contacted, under conditions of agitation, with a solution of a strong mineral acid in a monohydric aliphatic alcohol containing from 1 to 3 carbon atoms and separating the oil layer from the alcohol layer.

The formation of a deep blue green colouration indicates that extraction of terpenes is taking place. As the alcohol acts at the same time as an extraction solvent for other polar lipidic components, free fatty acids and unsaponifiables are removed also. The process of the invention therefore not only deterpenises the coffee oil but also refines it.

The presence of water decreases the rate of extraction, the fastest rates being obtained in the presence of less than 1% and especially less than 0.5% by weight of water, based on the weight of the solution. In the presence of more than 20% by weight of water, no extraction takes place at all.

Any strong mineral acid may be used in the process, for example nitric acid or hydrochloric acid. However sulphuric acid is particularly preferred. The concentration of the acid in the alcohol may vary from 0.1 to 2% but is preferably from 0.25 to 1.5% on a weight/volume basis. The rate of the extraction increases as the proportion of acid to oil increases. Preferably the proportion of acid to oil is from 2.5 to 15 parts and optimally from 5 to 10 parts by weight per 100 parts by weight of oil.

Of the alcohol solvents methanol is the most suitable because the oil is only slightly soluble in it and therefore the deep blue green colouration of the methanol layer is quite distinct from the coffee oil layer which is generally only slightly discoloured.

While ethanol is comparable to methanol, it has the disadvantage that it is somewhat hygroscopic and the technical grade contains a certain amount of water. The coffee oil is quite soluble in isopropanol at room temperature and therefore the yield is low and the oil is deep coloured and viscous: however, the rate of extraction is quite rapid.

The solubility in isopropanol may be decreased by adding water, for example in an amount up to 20% by weight based on the weight of the mixture. Although the rate of extraction is decreased and the process takes longer the yield is much improved. However if the time of contact is more than 4 hours the coffee oil tends to esterify and goes into solution.

The rate of the extraction decreases with increasing concentration of oil in the alcohol. The concentration is conveniently from 5 to 20 parts and optimally from 7.5 to 12.5 parts by weight per 100 parts by volume of alcohol.

The contact of the coffee oil with the alcoholic solution of strong mineral acid is preferably carried out with rapid stirring. While the contact may be carried out at ambient temperatures, the rate of extraction increases with increase in temperature and the contact is preferably carried out at reflux.

The duration of the contact may vary depending upon the requirements but preferably the contact is carried out for a period of time sufficient to remove at least 90% of the cafestol. The duration of the contact may conveniently be from 15 minutes to 2 hours, but it is preferably from 30 to 90 minutes.

The yield is improved by cooling and if the contact has been carried out at an elevated temperature, the mixture is preferably cooled before the oil layer is separated. The mixture may be allowed to cool slowly to room temperature or even lower and if the contact is carried out at reflux the mixture is preferably allowed to cool over a period of at least 2 hours before the oil layer is separated.

After the oil layer has been separated it may be washed to remove all or substantially all the residual acid with a lower alcohol, conveniently the same alcohol with which it was contacted, and subsequently dried. Preferably the oil layer is washed with methanol. The separated oil is of a quality comparable to edible vegetable oils and it may be subjected to further conventional technological treatments. For example it may be processed to render it tasteless and to remove traces of methanol by steam-stripping.

Since the improved oil contains no natural antioxidant, it must be protected further against organoleptic deterioration due to a high susceptibility to air oxidation. Therefore, if it is not subjected to the further processing treatment immediately it should be stabilised with antioxidants.

The improved oil may if desired be used for aromatising soluble coffee powder for example by spraying on to the coffee powder in the form of an emulsion with coffee aroma. Alternatively the improved oil may be used as an edible vegetable oil.

The following Examples further illustrate the invention.

EXAMPLE 1

One part by weight of coffee oil containing 5.6% by weight of cafestol was heated under reflux with 10 parts by volume of methanol containing 0.1 part by weight of sulphuric acid for 45 minutes and then slowly cooled down to room temperature. After 2½ hours the oil layer was removed, washed three times with 0.5 part of methanol and dried. The yield was 72% and the amount of cafestol present was found to be 0.20%.

EXAMPLES 2 to 6

A similar procedure to that described in Example 1 was followed but in which the amounts of oil and sulphuric acid used, the heating time, the yield and the amount of cafestol found to be present are designated in the following Table 1.

TABLE I

| Example | Sulphuric acid (parts by weight) | Oil (parts by weight) | Heating time (mins) | Yield | Cafestol present |
|---|---|---|---|---|---|
| 1 | 0.1 | 1.0 | 45 | 72% | 0.2% |
| 2 | 0.1 | 0.5 | 15 | 68% | 0.32% |
| 3 | 0.1 | 2.0 | 120 | 77% | 0.40% |
| 4 | 0.05 | 1.0 | 120 | 71% | 0.16% |
| 5 | 0.006 | 1.0 | 240 | 74% | 0.44% |
| 6 | 0.05 | 0.5 | 15 | 69% | 0.16% |

EXAMPLES 7 and 8

A similar procedure to that described in Example 1 was followed but instead of heating at reflux the oil was contacted with the solution of sulphuric acid in methanol at the temperature and times designated in the following Table II which also indicates the yield and the amount of cafestol found to be present.

TABLE II

| Example | Temperature | Time (hours) | Yield | Cafestol present |
|---|---|---|---|---|
| 7 | 40° C. | 9 | 71% | 0.32 |
| 8 | 26° C. | 15 | 73% | 0.40 |

I claim:

1. A process for improving coffee oil consisting essentially of contacting coffee oil, under conditions of agitation, with a solution of a strong mineral acid in a monohydric aliphatic alcohol containing from 1 to 3 carbon atoms and then separating the oil layer from the alcohol layer.

2. A process according to claim 1, wherein the mineral acid used is sulphuric acid.

3. A process according to claim 1, wherein the concentration of mineral acid in the alcohol is from 0.25 to 1.5% on a weight/volume basis.

4. A process according to claim 1, wherein the proportion of mineral acid to the oil is from 5 to 10 parts by weight per 100 parts by weight of oil.

5. A process according to claim 1, wherein the alcohol used is methanol.

6. A process according to claim 1, wherein the concentration of oil in the alcohol is from 7.5 to 12.5 parts by weight per 100 parts by volume of alcohol.

7. A process according to claim 1, wherein the coffee oil is contacted with the alcoholic solution of the mineral acid at reflux.

* * * * *